F. C. POLING.
ANTISKID DEVICE FOR TIRES.
APPLICATION FILED JULY 31, 1916.
1,270,550.
Patented June 25, 1918.
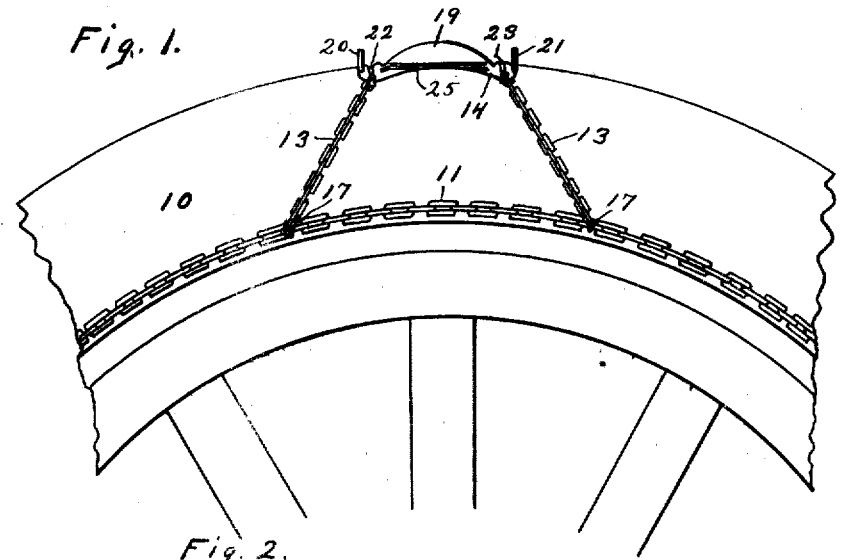
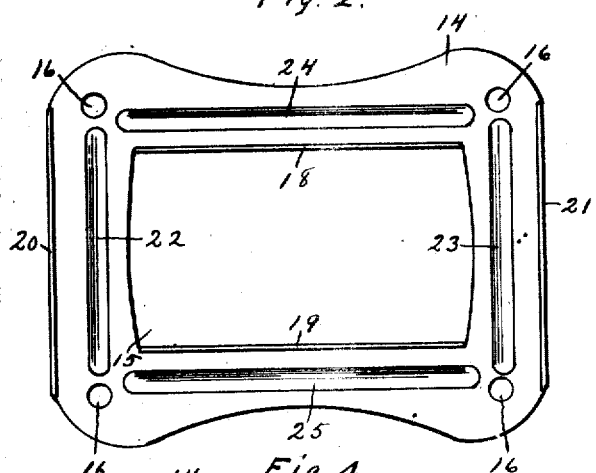
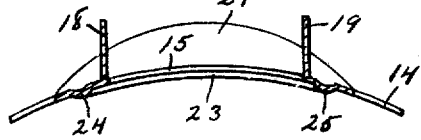
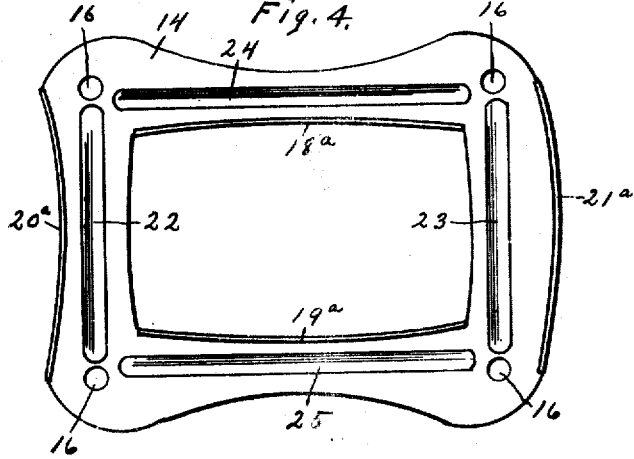
INVENTOR:
F. C. POLING

UNITED STATES PATENT OFFICE.

FRED C. POLING, OF MENLO, IOWA, ASSIGNOR TO GOODE ANTI-SKID CHAIN MANUFACTURING COMPANY, OF DES MOINES, IOWA, A CORPORATION OF ARIZONA.

ANTISKID DEVICE FOR TIRES.

1,270,550.  Specification of Letters Patent.  Patented June 25, 1918.

Application filed July 31, 1916. Serial No. 112,274.

*To all whom it may concern:*

Be it known that I, FRED C. POLING, citizen of the United States of America, and resident of Menlo, Guthrie county, Iowa, have invented a new and useful Antiskid Device for Tires, of which the following is a specification.

The object of this invention is to provide an improved construction for an anti-skid device for tires.

A further object of this invention is to provide an improved tread attachment for non-skid chains employed on pneumatic tires.

My invention consists in the construction, arrangement and combination of elements hereinafter set forth, pointed out in my claims and illustrated by the accompanying drawing, in which—

Figure 1 is a side elevation of a portion of a tire with non-skid chains and showing one of my improved devices in position for use. Fig. 2 is a plan view, on an enlarged scale, of one of the devices detached. Fig. 3 is a central cross-section of the same. Fig. 4 is a plan view of a modified form of the device.

In the construction of the device as shown the numeral 10 designates a tire which may be equipped with side chains 11, one of which is shown. My improvement consists of an anti-skidding plate or mat adapted to be attached to the side chains 11 by means of diagonally arranged connecting chains 13 joining the corners of said plate and said side chains. The plate proper consists of a body portion 14 of generally rectangular form, concavo-convex both longitudinally and transversely, and is formed with a relatively large aperture 15 in its central portion, and with holes 16 at its corners for attachment of the connecting chains 13. Each of the connecting chains 13 preferably is provided with a hook 17 (shown conventionally) at its opposite end for detachable connection to one or another of the side chains 11. Upstanding flanges 18, 19 are formed on the plate 14 at the side margins of the aperture 15, and parallel with the path of travel of the tire in use, and the outer margins of said flanges preferably are curved on arcs eccentric to the face of the plate. The plate 14 also is formed with upstanding flanges 20, 21 at its ends, extending transversely of the path of travel of the tire, and said end flanges also preferably have their outer margins curved on arcs eccentric to the face of the plate to prevent the accumulation of mud. The transverse end flanges 20, 21 extend across the longitudinal planes of the side flanges 18, 19 and also would be intersected by the longitudinal planes, if extended, of side corrugations hereinafter referred to, thus giving to said end flanges material and considerable compass of the tread surface over which the device is operated. Transverse corrugations or concavities 22, 23 preferably are formed in the body of the plate 14, parallel with and spaced inwardly from the end flanges 20, 21, and similar longitudinal corrugations or concavities 24, 25 are formed in said plate parallel with and spaced outwardly from the central flanges 18, 19. It is the function of the corrugations or concavities 22, 23, 24, 25, which may be pressed or stamped in the metal of the body 14, to engage the tire 10 and elevate said body relative to the tire, to facilitate the connection of the connecting chains 13 thereto, and prevent said chains from too intimate contact with said tire. The elevation of the plate through the use of the concavities, taken with the aperture 15 comprising a large part of the area of the plate, also prevents the accumulation of mud, gravel and the like between the plate and tire. The outer margins of the flanges 18, 19, 20, 21 being curved on arcs eccentric to the curvature of the plate provides for the maximum penetration of said flanges ' the centers thereof; it saves material at the ends of the flanges where it would be of little or no advantage on the wheels of motor vehicles; and it eliminates corners of said flanges which would have a tendency to be broken or bent in use.

The plate 14 may be curved in both directions to conform in a general way to the curvature of the tire.

In the modification shown in Fig. 4 the flanges 18ª, 19ª are curved outwardly slightly from the central aperture, and the end flanges 20ª, 21ª are curved on parallel arcs. This is of advantage where the device is used on paving, as the outer margins of the flanges are not so liable to penetrate joints or cracks between the paving members.

The anti-skid plate may be attached and detached readily and conveniently when desired, and are designed particularly for use when the ordinary chain devices are not sufficient to be effective. The outstanding flanges extending both longitudinally and transversely of the tread provide an effective grip on the road and prevent slipping or skidding of the wheel equipped therewith.

It is to be understood that various modifications may be employed, aside from the constructions herein shown, without departing from the spirit of my invention.

I claim as my invention—

1. A non-skid attachment for tires, comprising a plate formed with a relatively large aperture in its central portion, said plate being formed with longitudinal and transverse corrugation forming ribs on one face thereof which ribs are adapted to engage a tire and elevate the plate relative thereto.

2. An improved article of manufacture, having an arcuate plate formed with a relatively large oblong aperture in its central portion, said plate also being formed with parallel longitudinal flanges adjacent the side margins of said aperture, said flanges being formed with their outer margins on arcs eccentric to the face of the plate.

3. An improved article of manufacture, having a plate formed with transversely arranged flanges adjacent its ends, the perpendicular surfaces of said flanges being curved on parallel arcs.

Signed by me at Des Moines, Iowa, this 26th day of July, 1916.

FRED C. POLING.